United States Patent [19]

Dorner et al.

[11] Patent Number: 4,947,981

[45] Date of Patent: Aug. 14, 1990

[54] APPARATUS FOR INVERTING ARTICLES

[75] Inventors: Wolfgang C. Dorner, Oconomowoc; Kenneth N. Hansen, Waukesha, both of Wis.

[73] Assignee: Dorner Mfg. Corp., Hartland, Wis.

[21] Appl. No.: 337,652

[22] Filed: Apr. 13, 1989

[51] Int. Cl.⁵ ............................................. B65G 47/44
[52] U.S. Cl. .................................... 198/360; 198/402; 198/463.3; 198/532; 198/535
[58] Field of Search ............ 198/360, 406, 402, 463.3, 198/532, 535; 193/44

[56] References Cited

U.S. PATENT DOCUMENTS

| | | | |
|---|---|---|---|
| 1,638,920 | 8/1927 | Cramer | 198/360 |
| 2,790,567 | 4/1957 | Rockhill | 198/463.3 |
| 3,729,108 | 4/1973 | Rice | 198/402 |
| 4,031,709 | 6/1977 | Blankemeyer | 193/44 |
| 4,561,535 | 12/1985 | Taniguchi | 198/406 |
| 4,750,603 | 6/1988 | Dyer et al. | 198/463.3 |

*Primary Examiner*—Joseph E. Valenza
*Attorney, Agent, or Firm*—Andrus, Sceales, Starke & Sawall

[57] ABSTRACT

An apparatus for inverting articles that includes a receiving chute which is mounted for movement between a generally horizontal receiving position and an inclined discharge position. A curved inverting chute has an inlet end disposed to receive articles from the receiving chute when the receiving chute is in the discharge position and has an outlet end from which the inverted articles are discharged to a discharge site. A releasable stop member is associated with the receiving chute and prevents the articles from sliding from the receiving chute as the chute is tilted to the downward inclined discharge position. The stop member is automatically released as the receiving chute approaches its discharge position, so that the articles can then slide from the receiving chute to the inlet end of the inverting chute. A reject chute is mounted for movement between a storage position and an operative position where the reject chute is aligned with the receiving chute when the receiving chute is in the inclined discharge position. By moving the reject chute to the operative position, articles being discharged from the receiving chute will be by-passed to the reject chute for reject from the system.

17 Claims, 3 Drawing Sheets

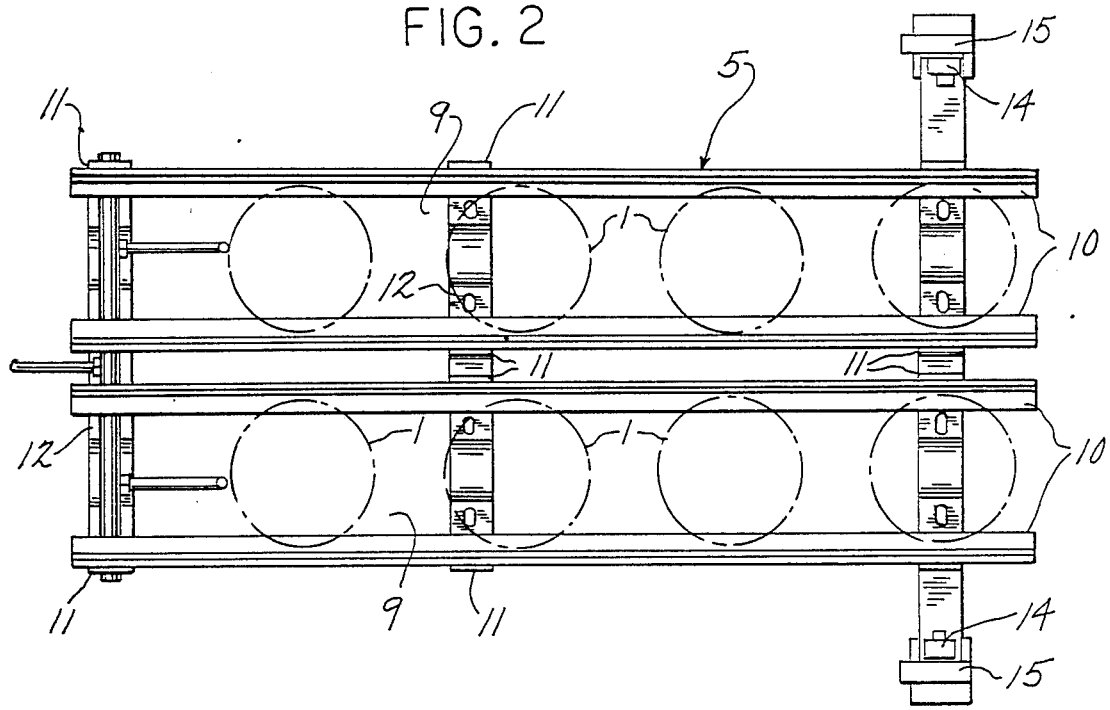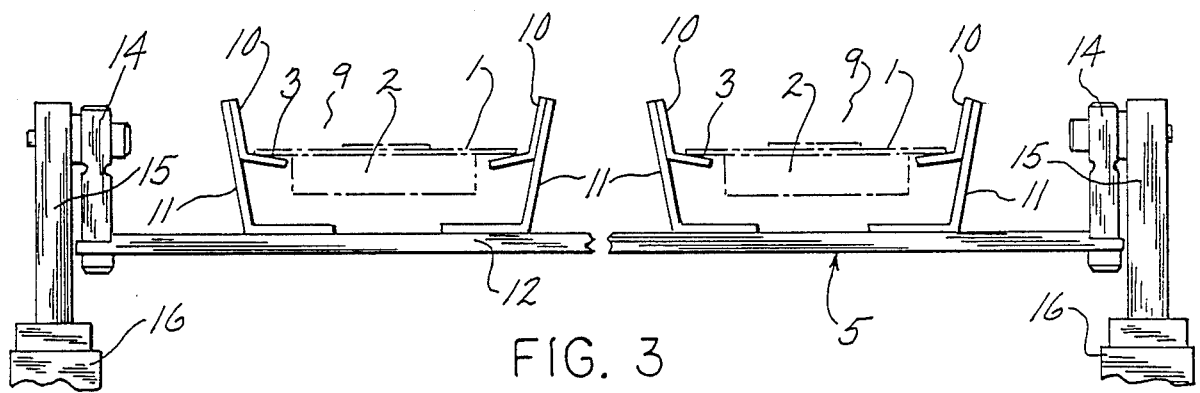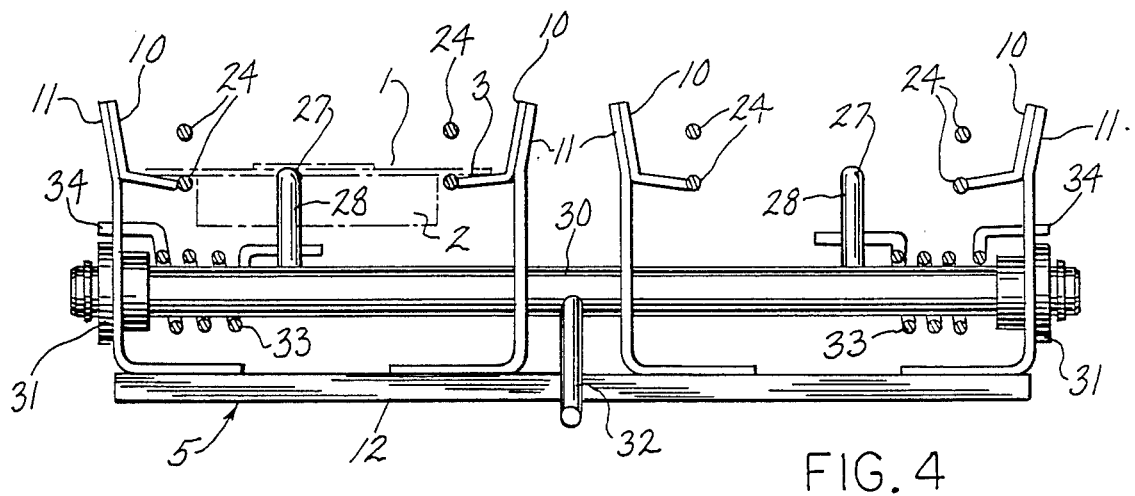

APPARATUS FOR INVERTING ARTICLES

BACKGROUND OF THE INVENTION

In certain automated production systems small injection molded parts are removed from a mold by a robot and placed on a conveying system where the parts are conveyed to various working or assembly stations. In certain instances the parts, as removed from the dies, may be in a position that does not facilitate subsequent working or assembly operations, with the result that the parts have to be moved or inverted before they can be transported to the assembly or working stations.

It is also desirable in automated conveyor systems to have a reject facility so that parts can be rejected from the conveyor system in the event downstream equipment does not have a speed of production comparable to upstream equipment, or in the event of a downstream blockage. Without a reject system, the entire conveying and assembling operation would have to be shut down in the event of such a blockage. With the use of a reject system, the parts can be rerouted to a second conveyor system, or to storage, so that upstream equipment does not have to be shut down during the period of the downstream blockage.

SUMMARY OF THE INVENTION

The invention is directed to an apparatus for inverting articles that is associated with an automated conveying system. The apparatus comprises a receiving chute, which is mounted for movement between a generally horizontal receiving position and a downwardly inclined discharge position. A curved inverting chute has an inlet end disposed in alignment with the receiving chute when the receiving chute is in the discharge position and has an outlet end from which articles are discharged onto a discharge conveyor, or other discharge site.

In operation, a group of articles are positioned on the receiving chute, preferably by a robot, when the receiving chute is in the horizontal receiving position. The receiving chute is then tilted to the inclined discharge position, and to prevent the articles from sliding from the receiving chute as the chute is pivoted to the downwardly inclined position, a releasable stop member is mounted for movement on the receiving chute from an obstructing position where it will prevent movement of the articles from the receiving chute, to a lowered or non-obstructing position.

As the receiving chute approaches the inlet end of the curved inverting chute, a release mechanism automatically moves the stop member to the non-obstructing position, so that the parts or articles can then slide from the receiving chute into the inverting chute. As the parts pass through the inverting chute they are inverted and discharged onto the discharge conveyor in the inverted condition.

As a feature of the invention, a reject chute is associated with the apparatus and is mounted for movement between a storage position and an operative position, where the reject chute is aligned with the lower end of the receiving chute when the receiving chute is in the inclined discharge position. In the event there is a stoppage downstream in the conveying system, the reject chute is moved to the operative position and the articles contained on the receiving chute will then pass directly from the receiving chute to the reject chute and hence to a reject location. Thus, with the invention, the articles supported on the receiving chute can be selectively delivered either to the inverting chute or to the reject chute.

With the invention, the parts or articles can be accepted from a robot, inverted, and fed to a conveying system for subsequent working or assembly operations. The apparatus is of simple construction in that the parts are moved by gravity through both the receiving chute and inverting chute or alternately through the rejection chute.

Other objects and advantages will appear in the course of the following description.

DESCRIPTION OF THE DRAWINGS

The drawings illustrate the best mode presently contemplated of carrying out the invention.

In the drawings:

FIG. 2 is a top plan view of the receiving chute;

FIG. 3 is a section taken along line 3—3 of FIG. 1;

FIG. 4 is a section taken along line 4—4 of FIG. 1

DESCRIPTION OF THE ILLUSTRATED EMBODIMENT

The drawings illustrate an apparatus for conveying and inverting small articles, such as components for video casettes. As illustrated, the articles 1 constitute a reel on which video tape is wound, and each article includes a generally cylindrical hub 2 and a peripheral flange 3 which extends outwardly from one end of the hub. However, it is contemplated that the apparatus can be employed to convey and invert various types of articles or parts.

Figure 1:
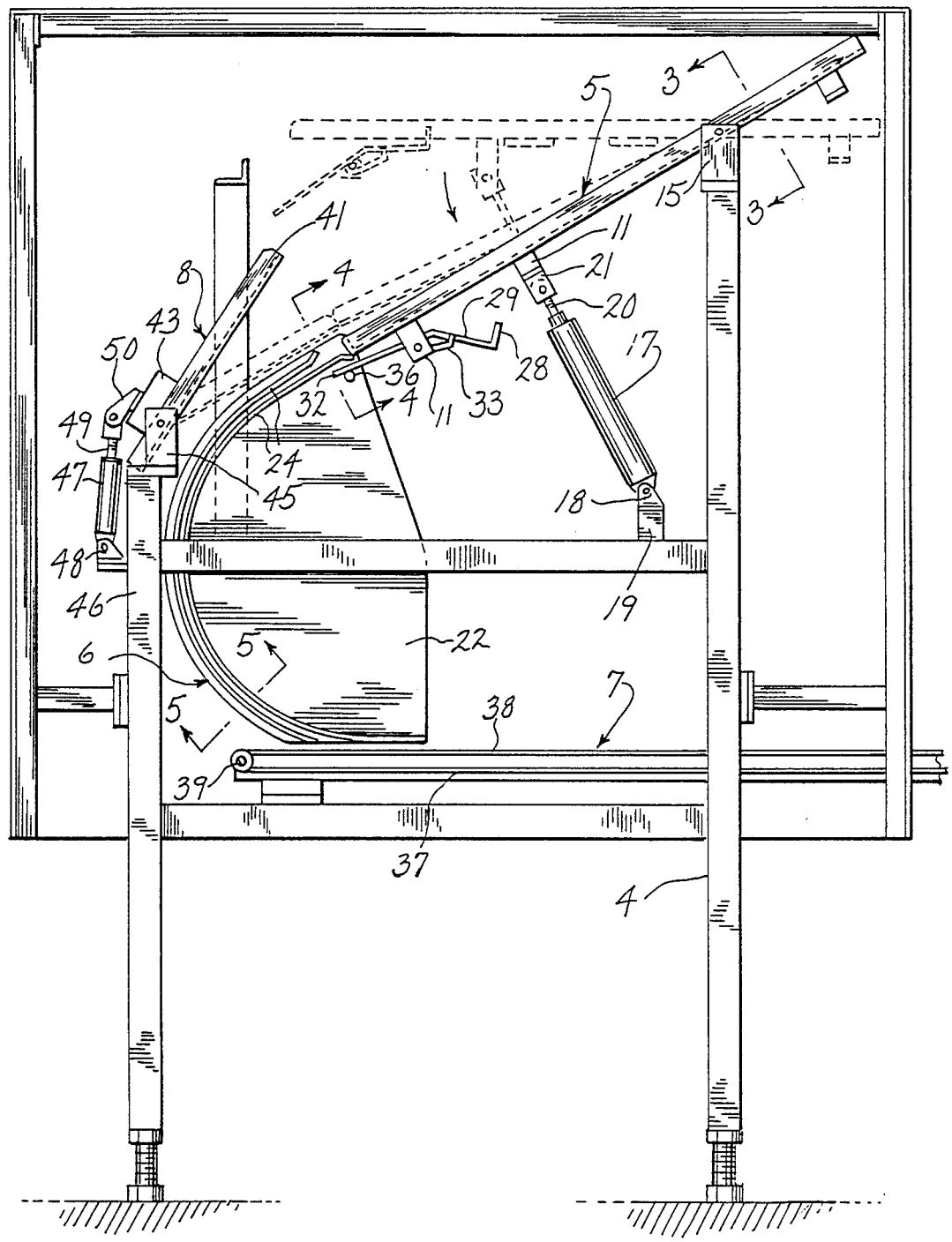
FIG. 1 is a side elevation of the apparatus of the invention.
Figure 7:
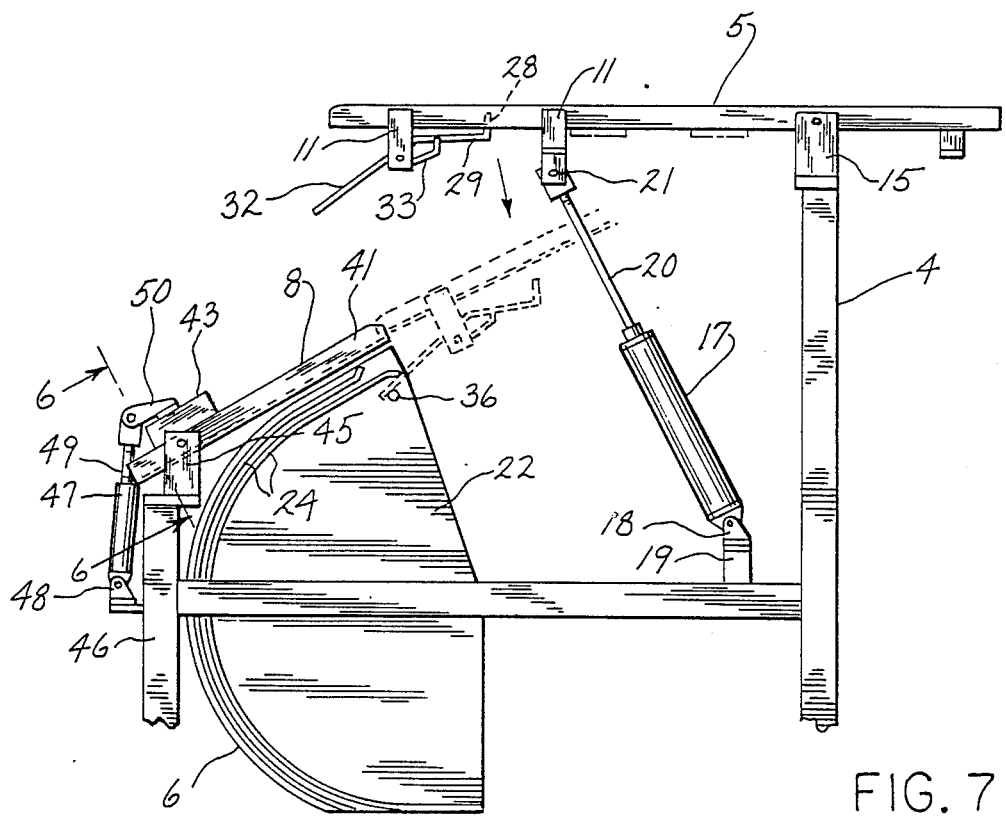
FIG. 7 is a view similar to FIG. 1 and showing the reject mode.

The apparatus includes a structural frame 4 and a receiving chute 5 is mounted for pivotal movement on the upper portion of frame 4 and can be pivoted between a generally horizontal receiving position, as shown in FIG. 7 and a downwardly inclined discharge position, as shown in FIG. 1. Also mounted on frame 4 is an inverting chute 6 having an inlet end to receive parts 1 from the receiving chute 5, when the receiving chute is in the downwardly inclined discharge position. Chute 6 has an outlet end from which the parts are discharged in an inverted manner onto a discharge conveyor 7.

The apparatus also includes a reject chute 8, which is mounted for pivoting movement on frame 4 between an upper storage position and a lower operative position where the reject chute forms an extension to the receiving chute 5 when the receiving chute is in the discharge position, so that parts can move directly from the receiving chute through the reject chute to a reject site.

As seen in FIGS. 2 and 3, receiving chute 5 includes a pair of parallel guideways 9 and each guideway is defined by a pair of spaced generally L-shaped guides 10. Each guide 10 includes a generally vertical leg which diverges upwardly and outwardly and a generally horizontal leg which extends downwardly at a small angle to the horizontal.

It is contemplated that a group of parts 1 will be positioned on the receiving chute 5 when it is in the horizontal receiving position by a robot. As illustrated in FIG. 2 eight parts 1 are positioned on chute 5 with four parts being located in spaced relation within each of the guideways 9. While the drawings show eight parts 1, four in each row, it is contemplated that the invention can be utilized with any number of parts. The inclined attitude of the vertical legs of guides 10 will act to guide the parts and center them in guideways 9 as they are being fed by the robot.

Guides 10 are supported by a series of L-shaped brackets 11 which are spaced along the length of recieving chute 5 and each bracket 11 is mounted on a cross bar 12.

As shown in FIG. 3, the parts 1 are positioned in the guideways with the hub 2 facing downwardly and being located between the spaced guides 10, while the peripheral flange 3 of each part rests on the guides 10.

To mount the receiving chute 5 for pivotal movement between the horizontal receiving position and the downwardly inclined discharge position, a pair of lugs 14 are mounted on the ends of the upstream cross bar 12 and the lugs 14 are pivotally connected to upstanding lugs 15 which are secured to the upper ends of vertical frame members 16.

To pivot the receiving chute 5, the lower end of a fluid cylinder 17, such as an air cylinder, is pivotally connected to a pair of lugs 18 which are mounted on horizontal frame member 19. Piston rod 20, which extends from the upper end of cylinder 17 is pivotally connected to lugs 21, which are attached to the lower surface of the central cross plate 12. By retracting piston rod 20 of cylinder 17, the receiving chute 5 can be moved from the horizontal receiving position to the downwardly inclined position, as shown in FIG. 1.

Figure 5:
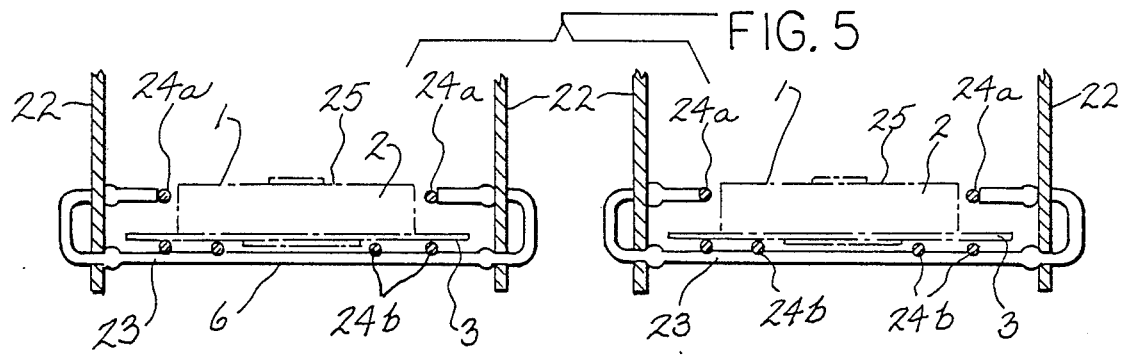
FIG. 5 is a section taken along line 5—5 of FIG. 1.

As illustrated in FIG. 5, inverting chute 6 includes two pair of spaced vertical plates 22 and transverse wire-form brackets 23 are connected between each corresponding pair of plates 22. Wire guides 24 are secured to brackets 23 and define a guideway 25 between each pair of corresponding plates 22. Guideways 25 are disposed in alignment with guideways 9 when the receiving chute 5 is in the downwardly extending discharge position.

As shown in FIG. 1, the guide wires 24 at the inlet end of inverting chute 6 can flare outwardly to facilitate entry of the parts into the guideways 25.

As seen in FIG. 5, the hub 2 of each part is retained between the opposed guide wires 24a, while the flange 3 will ride against the guide wires 24b as part 1 moves within chute 6.

As recieving chute 5 is tilted downwardly, parts 1 will slide downwardly along guideways 9, and to prevent the parts from sliding out of the guideways until the receiving chute reaches its discharge position, a stop member 27 is associated with each of the guideways 9. Each stop 27 is generally L-shaped in configuration and includes a generally vertical leg 28 which, in its obstructing position, extends upwardly between the guides 10 of each guideway in position to be engaged by the flange 3 of the leading part 1 in the row, as seen in FIG. 7.

Stop 27 also includes a generally horizontal leg 29, which is secured to a shaft 30 which is mounted for rotation in bearings 31 mounted in brackets 11, as seen in FIG. 4.

An arm 32 is also secured to shaft 30 and is located between guideways 9. Arm 32 projects outwardly from shaft 30 in the opposite direction from legs 29.

Each vertical leg 28 is biased to an obstructing position by a torsion spring 33, which is disposed around shaft 30. One end 34 of spring 33 is secured within an opening in bracket 11, while the opposite end of the torsion spring is engaged with the horizontal leg 29. With this arrangement the force of the spring will urge vertical leg 28 upwardly to an obstructing position.

Stop 27 is automatically released and moved to a non-obstructing position as the receiving chute 5 moves toward the downwardly inclined discharge position. In this regard, a horizontal rod 36 extends transversely of plates 22 of chute 6. Rod 36 is positioned to be engaged by the end of arm 32 as the receiving chute 5 approaches its downwardly inclined position, thereby releasing stops 27 and enabling the parts 1 to slide from the end of the receiving chute 5 into the guideways on the inverting chute 6.

Discharge conveyor 7 is a conventional type and includes a generally U-shaped frame 37. An endless belt 38 is mounted for travel on an idler pulley 39 and a drive pulley, not shown. The parts 1 being discharged from the guideways 25 of chute 6 are conveyed away on the moving belt 38 to the desired working or assembly stations.

Figure 6:
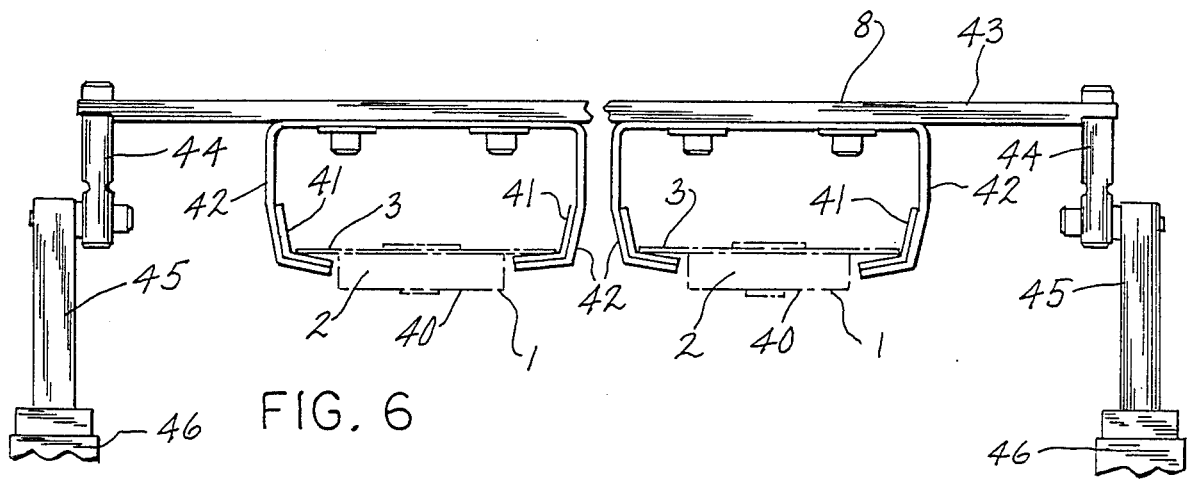
FIG. 6 is a section taken along line 6—6 of FIG. 7.

As a feature of the invention, reject chute 8 can be selectively operated to reject the parts from the receiving chute 5, in the event of a downstream blockage. Reject chute 8 includes a pair of parallel guideways 40, each of which is defined by a pair of spaced generally L-shaped guides 41 which are similar in construction to guides 10. Guides 41 are secured to C-shaped brackets 42 which are mounted on cross bar 43. As shown in FIG. 6, the ends of cross bar 43 carry lugs 44 which are pivotally connected to lugs 45 on vertical frame member 46. Thus, the reject chute 8 can pivot in a vertical plane about the axis of the pivotal connection between lugs 44 and 45.

To pivot the reject chute, the lower end of an air cylinder 47 is pivotally attached to lugs 48, which extend outwardly from frame 4 and piston rod 49 of cylinder 47 is connected to lugs 50, which are secured to the upper surface of cross bar 43. By extending piston rod 49 the reject chute 8 will be moved from an upwardly inclined storage position to an operative position where it forms an extension to the receiving chute 5 when the receiving chute is in the downwardly declined discharge position. In the reject mode, parts 1 sliding from the downstream end of chute 5, will pass through the reject chute to a suitable reject site.

As shown in FIG. 7, the reject chute has a length such that the discharge end of chute 5 will engage the end of reject chute 8 and prevent the receiving chute from moving further downwardly into alignment with the inverting chute 6.

In operation, a group of parts 1 are placed on the receiving chute 5 when the receiving chute is in the horizontal receiving position. The parts can either be placed on chute 5 manually or through operation of a robot. At this time, the stop members 47 are biased to their upper or obstructing position.

A suitable sensing mechanism, not shown, is incorporated which will sense the presence of parts 1 on receiving chute 5. The sensing mechanism will then operate cylinder 17 to move the chute 5 downwardly to the discharge position. As the chute 5 pivots downwardly, parts 1 will slide downwardly in guideways 9, but will be retained in the guideways by engagement of the leading or downstream parts with the obstructing stops 27.

As chute 5 approaches its downwardly inclined position, arm 32 will engage rod 36 thereby pivoting stops 27 to the non-obstructing position and permitting parts 1 to slide from the lower end of chute 5 into the inverting chute 6. As the parts pass through the inverting chute, they are inverted and are discharged onto the discharge conveyor 7.

In the event there is a blockage downstream, or for any other reason it is desired to reject parts, reject chute 8 is pivoted downwardly by operation of cylinder 47 to its operative position directly above chute 6. As receiving chute 5 pivots downwardly, the distal end of the receiving chute will engage the end of the reject chute 15 to align chute 5 with chute 8 so that the parts sliding from guideways 9 will then be directed into the guideways 40 of reject chute 8 and be rejected to the exterior.

The release mechanism for stops 27 is arranged so that the stops will be moved to the unobstructing position before chute 5 reaches a position in alignment with reject chute 8, so that the parts can slide from chute 5 into chute 8 for reject.

Various modes of carrying out the invention are contemplated as being within the scope of the following claims particularly pointing out and distinctly claiming the subject matter which is regarded as the invention.

We claim:

1. An apparatus for conveying and inverting articles, comprising a receiving chute mounted for movement between a receiving position and an inclined discharge position, said receiving chute disposed to receive an article when in the receiving position, operating means for moving the receiving chute between said receiving position and said discharge position, curved inverting chute means having an inlet end disposed to receive articles from said receiving chute when said receiving chute is in the discharge position and having an outlet end, said inverting chute means being constructed and arranged to invert articles as the articles pass from said inlet end to the outlet end, releasable stop means connected to said receiving chute and having an obstructing position disposed to prevent said article from sliding from said receiving chute as the receiving chute is moved toward said inclined discharge position, release means for automatically moving said stop means from the obstructing position to a non-obstructing position, and reject chute means mounted for movement between a storage position and an operative inclined position wherein said reject chute means is aligned with said receiving chute when the receiving chute is in the inclined discharge position, whereby said article will pass from said receiving chute to said reject chute means.

2. The apparatus of claim 1, and including means operable as a consequence of said receiving chute approaching its discharge position for actuating said release means.

3. The apparatus of claim 1, and including second operating means for moving said reject chute means between said storage position and said operative position.

4. The apparatus of claim 1, wherein said reject chute means is mounted for pivoting movement between said storage and operative positions.

5. The apparatus of claim 1, wherein said receiving chute and said inverting chute means each include a pair of generally parallel side members spaced laterally to provide an elongated slot therebetween.

6. The apparatus of claim 1, wherein said operating means comprises fluid cylinder means.

7. The apparatus of claim 1, wherein said receiving chute and said inverting chute means each include a pair of parallel guideways, each guideway disposed to receive a plurality of said articles in end-to-end relation.

8. The apparatus of claim 1, and including discharge means disposed at the outlet end of said inverting chute means.

9. The apparatus of claim 1, wherein said stop means is mounted for pivotal movement between said obstructing and non-obstructing positions.

10. The apparatus of claim 9, wherein said release means comprises a fixed abutment disposed to be engaged by said stop means.

11. An apparatus for conveying and inverting articles, comprising a receiving chute mounted for movement between a generally horizontal receiving position and a downwardly inclined discharge position, means for feeding a plurality of articles to said receiving chute when in the receiving position, first operating means for moving the receiving chute between said receiving position and said discharge position, second chute means having an inlet end disposed to receive articles from said receiving chute when said receiving chute is in said discharge position and having an outlet end for discharging said articles, said second chute means being constructed and arranged to invert said articles as the articles pass from said inlet end to said outlet end, releasable stop means movably mounted on said receiving chute and movable between obstructing position where said stop means prevents said articles from sliding from said receiving chute as the receiving chute is moved to the inclines discharge position and an non-obstructing position, release means for automatically moving said stop means from the obstructed position to the non-obstructed position as said receiving chute approaches said discharge position, and reject chute means mounted for pivotal movement between a storage position and an operative position where said reject chute means forms an extension to said receiving chute when the receiving chute is in the inclined position, whereby articles being discharged from said receiving chute will pass through said reject chute means to a reject site.

12. The apparatus of claim 11, and including means for aligning said reject chute means when in the operative position with said receiving chute when in said discharge position.

13. The apparatus of claim 11, wherein said inverting chute means is curved and is disposed in a vertical plane.

14. The apparatus of claim 11, wherein said reject chute means when in said operative position is disposed above the inlet of said second chute means.

15. An apparatus for conveying and inverting articles, comprising a supporting structure, a receiving chute having a first end pivotally connected to said supporting structure and having a second distal end, said receiving chute being mounted for movement between a generally horizontal receiving position and a downwardly inclined storage position, means for feeding articles to said receiving chute when in the receiving position, first operating means for moving the receiving chute between said receiving position and said discharge position, second chute means having an inlet end disposed to receive articles from said receiving chute when said receiving chute is in said discharge position and having an outlet end for discharging said articles, said second chute means being constructed and arranged to invert said articles as the articles pass from said inlet end to said outlet end, releasable stop means movably mounted with respect to said receiving chute and movable between an obstructing position where said stop means is disposed to be engaged by the leading end of an article sliding downwardly on said receiving chute as said receiving chute is pivoted from the receiving position to the discharge position, said stop means also having an unobstructing position where said stop means will not interfere with discharge of said article from said receiving chute, and release means for automatically moving said stop means from the obstructing position to the non-obstructing position as said receiving chute approaches said discharge position.

16. The apparatus of claim 15, wherein said receiving chute includes a pair of spaced longitudinal side members having a gap therebetween and said stop means is mounted for pivotal movement through said gap from the non-obstructing position to the obstructing position.

17. The apparatus of claim 16 and including biasing means for biasing the stop means to the obstructing position.

* * * * *

UNITED STATES PATENT AND TRADEMARK OFFICE
CERTIFICATE OF CORRECTION

PATENT NO. : 4,947,981

DATED : August 14, 1990

INVENTOR(S) : WOLFGANG C. DORNER ET AL

It is certified that error appears in the above-identified patent and that said Letters Patent is hereby corrected as shown below:

Col. 6, Line 31, CLAIM 11, After "between" insert --an--;

Col. 6, Line 34, CLAIM 11, Delete "inclines" and substitute therefor --inclined--; Co. 7, Line 10, CLAIM 15, Delete "unobstructing" and substitute therefor --non-obstructing--

Signed and Sealed this

Second Day of June, 1992

*Attest:*

DOUGLAS B. COMER

*Attesting Officer*     *Acting Commissioner of Patents and Trademarks*